UNITED STATES PATENT OFFICE.

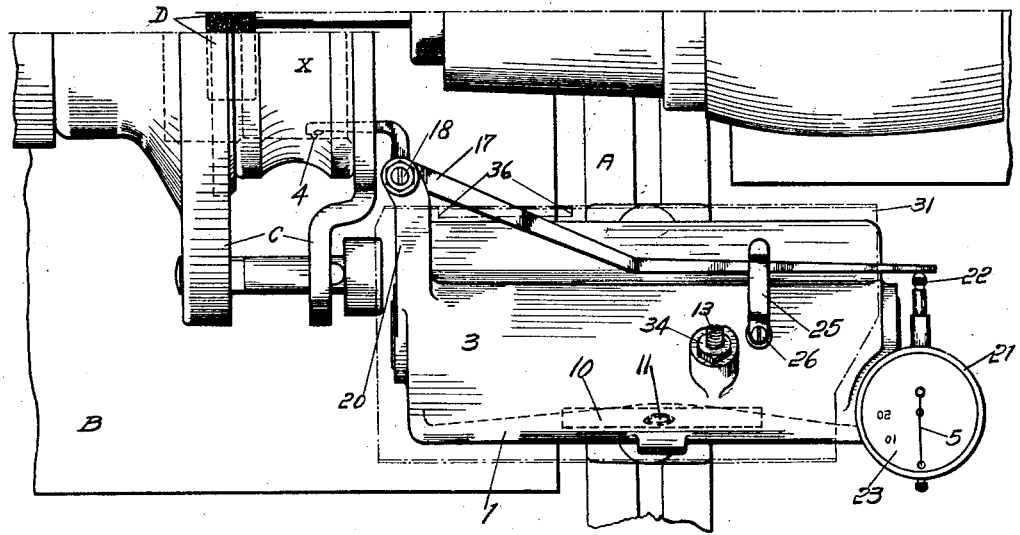

CHARLES B. SIMMONS AND FREDERICK G. HUGHES, OF BRISTOL, CONNECTICUT, ASSIGNORS TO THE NEW DEPARTURE MANUFACTURING COMPANY, OF BRISTOL, CONNECTICUT, A CORPORATION OF CONNECTICUT.

MEASURING INSTRUMENT.

1,387,622.      Specification of Letters Patent.      Patented Aug. 16, 1921.

Application filed September 11, 1916. Serial No. 119,335.

*To all whom it may concern:*

Be it known that we, CHARLES B. SIMMONS and FREDERICK G. HUGHES, citizens of the United States, residing at Bristol, county of Hartford, State of Connecticut, have invented a certain new and useful Measuring Instrument, of which the following is a full, clear, and exact description, such as will enable others skilled in the art to which it appertains to make and use the same, reference being had to the accompanying drawings, forming part of this specification.

Our invention relates to measuring instruments, more particularly to gages, and yet more particularly to gages adapted for mounting upon dimensioning machines, for indicating dimensions of a piece being operated upon by such a machine.

One object of our invention is to provide a gage whose contacting and indicating parts can be moved from and returned to gaging position without destroying the calibration-setting of the device.

Another object is to provide a gage of the character indicated whose parts are well protected from fouling, as by flying emery, oil and water, whereby the device will preserve its accuracy when mounted upon a grinding machine adjacent the grinding wheel and the work.

Another object is to provide a gage of the character indicated which will continuously indicate dimensions of a piece being operated upon by a dimensioning machine.

To these ends, and also to improve generally upon devices of the character indicated, our invention consists in the following matters hereinafter described and claimed.

In the accompanying drawings—

Figure 1 is a fragmental top view of the portion of a grinding machine intermediate the ends of the bed and at the front side of the center lines of the rotating work and tool spindles, and showing a gage embodying our invention mounted in operative position upon such machine and with its contact element engaging the work;

Fig. 2 is a front elevation of the gage illustrated in Fig. 1, the carriage being partially broken away the better to show the construction;

Fig. 3 is an end view of the device, looking toward the left in Figs. 1 and 2; and Fig. 4 is a fragmental view of the upper portion of the base of the device illustrated in Figs. 1 to 3, and certain related parts.

Without restricting our invention thereto we show and describe it as embodied in a gage for measuring and indicating interior dimensions, *e. g.*, dimensions of the bores of cones for ball bearings.

The illustrated gage, designated generally as 1, comprises a base element, or support, 2 and a carriage or carrier 3 for supporting the gaging devices proper, these being, in the illustrated device, a contact element 4 movably mounted upon the carriage and a pointer 5 operatively connected to the contact element for showing the positions and movements thereof.

In the use for which the illustrated device is more particularly adapted the base 2 is rigidly attached to the cross-bridge A of an internal grinding machine B and the contact element 4 is brought into contact with the bore of a rotating cone X held in the chuck C and being internally ground by the longitudinally reciprocating, and rotating, grinding wheel D. The gage is calibrated by noting the scale-mark at which the pointer 5 stands when the contact element is in gaging contact with the bore of a chucked cone of standard diameter.

Means are provided whereby the carriage and the contact element can be (1) moved out of the way of the workman and (2) moved back into gaging position, such means providing that, for the sake of the great accuracy necessary in this character of grinding work, each time the contact element is brought to final gaging position it is brought to lie, when the pointer stands at the previously selected "standard" mark, on a diameter located as was that diameter of the standard cone on which the element lay during calibration, and is also brought to lie at the same radial distance from the axis of rotation of the cone as it lay during calibration. So, if the grinding is discontinued when the "standard" mark is reached, all the cones ground will be of the same standard bore. In the illustrated device such means are provided as follows.

The carriage element 3 is longitudinally slidably, oscillatively and adjustably mounted upon the base element 2. The base presents a bearing at its upper portion, such upper portion being provided with a longitudinal cylindrical bore 6. The carriage carries, fixed with respect thereto, and depended therefrom as by brackets 7, 7, a cylindrical bar 8. This bar is slidably and oscillatively fitted in the bore 6. With this construction the carriage can be slid backward, e. g., to the right in Fig. 1, to move the contact element from the work and can then be oscillated backward, e. g., anticlockwise in Fig. 3. This oscillation much reduces the distance necessary to slide the carriage in order to place the contact element and the carriage out of the way of the workman when he desires to take work out of, or to put work into, the chuck C. (The chuck is filled, as is common, by introducing the work into the front face thereof by a movement longitudinal of the machine.) This reduction of sliding not only adapts the device for use on machines having a relatively short free work bed but also saves much of the workman's time.

The cylindrical bore and bar are not only desirable for the above reasons but also are desirable for the reason that they, unlike simple slideways, can be machined with accuracy and fitted together practically without play. This provides that the contact element will travel true longitudinally.

In order to predetermine the height of the contact element when in gaging position, i. e., the "swung down" position of the carriage, the base is illustrated as provided for example, integrally with a projecting longitudinal ear 9, preferably having fast mounted, upon its lower side, a track plate 10. The carriage carries an adjustable abutment, or screw 11, Fig. 4, screwed through the carriage, projecting upward to abut and slide along the track plate. By adjustment of the screw 11 the height of the contact element can be accurately fixed. Also the abutting of the screw upon the track insures that each time the carriage is swung down the contact element will be brought to the same height as at every other time.

As illustrated, the carriage has the character of an apron overlying and protecting the bar 8 and the bore 6 from being fouled, as by flying emery, oil, etc. Thus, the apron assures that the initial fit and trueness of travel and accuracy of location of the contact element will be preserved, making the device practicable for location and use close to the rotating work and the grinding tool of a grinding machine. The apron also similarly protects the track plate and the screw 11. The carriage is shown as substantially arc-shaped transversely (Fig. 3) and as having its lower (in Fig. 1) edge inturned as a triangular projection, as indicated by the dotted lines in Fig. 1, to underlie the ear 9 and to carry the screw 11.

As here illustrated a spring plate 12 is fixed to the end of the ear 9 and is bent to overlie, to be spaced from, and to incline upwardly from, the top of the ear. The carriage carries an adjustable abutment, as the screw 13 screwed through the carriage, located for contact with the spring plate, the plate inclining toward the screw in the direction of forward sliding. When the carriage is slid forward, i. e., to the left in Fig. 2, the screw 11 slides along its track while the screw 13 gradually comes into contact with the inclined spring plate and, sliding along it, presses it downward. Evidently, the body of the carriage provides connecting means between the screw 11 and the screw 13 of a character such that the distortion of the spring forces the screw 11 against the plate 10. This provides an effective means for locking or clamping the carriage to the base to at least the extent of preventing any oscillation and, if desired, to the extent of preventing longitudinal sliding.

By adjustment of the screw 13 the tightness with which the carriage is clamped to the base can be adjusted and determined. The abutment screw 13 is, of course, so located longitudinally with respect to the ear 9 that, when the carriage is in right hand position, the abutment is free of the ear and the spring, whereby the carriage can be turned to "swung up" position.

As here shown the bar 8 carries a stop-collar 14 slidable thereon but capable of being fixed in adjusted position thereon, as by the set screw 15 engaging the "flat" 16 on the bar. This collar abuts the bearing-provided portion of the base 2 when the carriage is in forward position and so determines the forward position of the contact element 4, it being desirable, for various reasons, that, on each cone, the contact element be projected the same distance into the bore as on every other cone.

The contact element 4 may be mounted upon the carriage and provided with indicating means in any suitable manner. In the illustrated device the contact element, as a diamond, is carried upon the short arm of a multiplying lever 17. The lever is fulcrumed between conical-ended screws 18, 18, fitted in corresponding conical recesses in the lever (Fig. 3), the screws being carried by, and screwed through, lugs 19, 19, upon an extension 20 of the left-hand bracket 7. It will be seen that the just referred to bracket 7, with its extension 20, provides a means for carrying the contact element and lever, that the apron-like central portion of the carriage forms a shielding device and that, in the present device, said bracket 7, the shielding device and the right hand bracket 7, all conveniently integrally connected, provide the carriage.

The short arm of the lever 17 projects sufficiently beyond the end of the carriage to permit of the introduction of the contact element well into the interior of the work without the likelihood of the introduction being hindered by interference between the carriage and the work or the chuck.

An ordinary dial indicator 21, with outwardly pressed plunger 22 and rotatably adjustable dial 23, is shown mounted on the carriage by the screw 24. The plunger contacts the lever adjacent the end of the longer arm. The contact element may be kept in contact with the work in any suitable manner and conveniently, and as here illustrated, the outwardly urged plunger of the indicator may perform this function. Desirably there may be used an indicator graduated, and reading, to .001 inch and a lever giving an 8:1 multiplication, giving readings to one-eighth of .001 inch.

If desired a hook 25 may be fixed to the carriage, as by a screw 26, to limit the outward movement of the lever under the influence of the plunger but, of course, so located as not to interfere with the desired range of movement of the contact element. A spring 27 (Figs. 2 and 3) may be fixed to the base to contact, say, the inturned lower edge of the carriage when the carriage is in "swung up" position. The device may be attached to the cross-bridge by the usual bolt-and-T-slot construction, as indicated in Fig. 2. The track plate 10 may be fastened to the ear, or track proper, 9, by screws, as 28, (Fig. 4) and the spring plate 12 fastened by a screw 29. Preferably a bushing 30 (Fig. 2) is provided in the bore 6. To protect the lever 17, and to additionally protect the bar 8 and the bore 6, a sheet metal cover 31, indicated, for the sake of clearness, merely by dot-and-dash lines in Figs. 1 and 3, and having aperture 36 for free passage of the lever, may if desired be provided. Such cover may be held to the carriage as by fitting the bore 32 of the cap 33 (Fig. 3) (attached to the cover) over the top of the screw 13, the cap conveniently furnishing a handle with which to manipulate the carriage. Lock nuts 34, 34, and 35, 35, may be provided for the screws 11 and 13, and 18, 18.

In calibrating, the "standard" scale-mark is desirably selected by turning the dial of the indicator to bring the "zero" beneath the pointer when the contact element is in gaging contact with the standard cone. So, in use, the workman watches the pointer of the indicator as it, approaching "zero" as the grinding proceeds, indicates the changes in dimension of the work, and, when the pointer reaches "zero", discontinues the grinding.

In Fig. 1 we have indicated, in dotted lines, the bottom face of the track plate 10, the top face of the inturned edge of the carriage, and the top end of the screw 11. For the sake of clearness, the other portions of these parts are not shown.

In operating that example of our invention illustrated in the accompanying drawings, the measuring instrument being fastened to the machine, the grinding tool D being drawn away from the chuck C, and a "standard" article, as X, (that is, one whose interior diameter is of the desired size) having been secured in position in the chuck, the measuring instrument is brought into the position indicated in Fig. 1, with its contact element 4 bearing against the interior surface of the article X, whereupon the position of the pointer 5 of the indicator 21 is noted, or, preferably, the dial 23 of the indicator is turned to bring its zero under the pointer, so that zero thus becomes the gage-indication for the desired diameter of the articles to be subsequently operated upon. The whole carrier is then moved longitudinally to the right, as the parts are illustrated in Figs. 1 and 2, the bar 8 sliding in the bore 6, until the contact element 4 is carried out of the article X and the stop 13 is clear of the longitudinal ear 9, and then the carrier is swung up, its bar turning in the bore 6 of the base element or support 2, the carrier 3 being held in this tilted position by the engagement of the spring 27 with the edge of the carrier. The measuring instrument being thus gotten out of the way, the "standard" article X is removed from the chuck and one to be ground is substituted for it. Then the carrier 3 is swung down and is pushed to the left (so that the ear 9 is engaged between the stops 11 and 13) until the stop 14 engages with the end of the bore portion of the support 2, the contact element 4 being, meanwhile, guided into the opening of the article X so that it rests against the surface to be ground. Thus the carriage 3 is returned to exactly the position it occupied when the contact element engaged the "standard" article, and the amount by which the contact element varies from the position it occupied when engaging the "standard" article shows, on the indicator 21, how much the interior diameter of the article now to be operated upon varies from standard. The grinding tool D is now started to work on the surface to be reduced and, as the usual spring of the indicator 21 keeps the plunger 22 of the indicator pressed against the arm 17, the contact element 4 is kept pressed against the surface being reduced and the progressive reduction is indicated by the pointer 5. When the pointer reaches the dial mark at which it stood when the "standard" article was in the chuck (zero in the case above described) the workman knows that the interior diameter of the article being operated upon has been brought to the desired size and he stops the grinding operation, withdrawing the grinding tool D. Then he slides the carrier 3 away from the chuck and swings it up, as previously described, removes the ground article X from the chuck and inserts an unground one, swings down the carrier and slides it to the left as before, and starts the new grinding.

It will be seen that we have provided a gage, more particularly an interior gage, which is accurate, whose contact element can be moved into and out of gaging position without destroying or affecting the calibration-setting of the device, whose parts are well protected, which enables inexpert workmen to produce accurate work and which, withal, is simple in construction and easy to adjust and operate.

Having thus described our invention, what we claim as new and desire to secure by Letters Patent is—

1. In a measuring instrument, a support, measuring-device-carrying means carried by said support, means connecting said first named means to said support for both longitudinal and oscillative movement with respect thereto, means automatically operable during one of said movements for clamping said carrying means to said support, and a measuring device carried by said carrying means; substantially as described.

2. In a measuring instrument, a support, measuring-device-carrying means carried by said support, means connecting said first named means to said support for both longitudinal and oscillative movement with respect thereto, means for preventing said oscillative movement in certain of the positions occupied by said carrying means in said longitudinal movement, means for limiting the extent of said longitudinal movement, and a measuring device carried by said carrying means; substantially as described.

3. In a measuring instrument, supporting means, measuring-device-carrying means mounted upon said supporting means for longitudinal and oscillative movement relative thereto, means for connecting said carrying means to said supporting means, means for clamping the said first and second named means to each other to prevent said oscillative movement in certain of the positions occupied by said carrying means in said longitudinal movement, such clamping means being constructed and arranged to permit said oscillative movement in certain of the positions occupied by said carrying means in said longitudinal movement and, to automatically prevent said oscillative movement as the longitudinal movement progresses, and a measuring device carried by said carrying means; substantially as described.

4. In a measuring instrument, supporting means, measuring-device-carrying means supported upon said supporting means for movement relative thereto, a track carried by one of said means and extending in the direction of said movement, an abutment carried by the other said means, said abutment contacting said track and there being relative travel therebetween during said movement, means for clamping said abutment and said track, the one to the other, thereby to clamp said carrying means to said supporting means in certain of the positions occupied by said carrying means in said movement, and a measuring device carried by said carrying means; substantially as described.

5. In a measuring instrument, a supporting element, a measuring-device-carrying element mounted upon said supporting element for movement relative thereto, said elements carrying portions in contact during said movement, means for forcing said portions into contact as said movement progresses; said forcing means comprising an abutment carried by one of said elements, and a spring plate carried by the other said element, extending in the direction of said movement, inclined toward said abutment, and arranged for contact by said abutment thereby to be distorted during said movement; means connecting certain of said portions and certain of the elements of said forcing means and of a character whereby distortion of said spring plate forces said portions into contact, and a measuring device carried by said carrying element; substantially as described.

6. In a measuring instrument for gaging work being operated upon by a machine tool, a support adapted to be fixed upon a part of such a tool and means for so fixing it, a device on said support for carrying a contact element for gaging contact with the work, means by which said device is movably mounted with relation to said support whereby, upon movement of said device, said element can be moved to and from said work, and means operable upon the advance of said element into gaging contact with said work for automatically locking said device in position with said element in initial position with respect to said work; substantially as described.

7. In a measuring instrument for gaging work being operated upon by a machine tool, a support adapted to be fixed upon a part of such a tool and means for so fixing it, a device on said support for carrying a contact element for gaging contact with the work, means by which said device is movably mounted with relation to said support whereby, upon movement of said device, said element can be moved to and from said work, and means operable upon the advance of said element into gaging contact with said work for automatically locking said device in position with said element in initial position with respect to said work, and operable upon movement of said element away from said work for automatically releasing said device; substantially as described.

8. In a measuring instrument, a support, a carrier, a gaging device carried thereby and including a work-contacting element, means whereby said carrier has work-disengaging movement with respect to said support through a considerable distance, whereby said carrier can be moved sufficiently to carry said work-contacting element free of the work, said carrier also having movement with respect to said support in a direction angularly related to its work-disengaging movement, and means for re-locating said carrier in a given position upon said support after it has been moved from said position in each of said directions of movement; substantially as described.

9. In a measuring instrument, a support, a carrier, a gaging device carried thereby and including a work-contacting element, means whereby said carrier has work-disengaging movement with respect to said support through a considerable distance, whereby said carrier can be moved sufficiently to carry said work-contacting element free of the work, said carrier also having movement with respect to said support in a direction angularly related to its work-disengaging movement, and adjustable coöperating stop-instrumentalities upon said support and said carrier operative in each of said directions of movement; substantially as described.

10. In a measuring instrument, a support, a carrier, means whereby said carrier is slidably and rockably supported on said support, a gaging device carried by said carrier, and coöperating stop-instrumentalities upon said support and said carrier operative in each of said directions of movement of said carrier; substantially as described.

11. In a measuring instrument, a support, a carrier including a bar slidably and rockably mounted upon said support, a gaging device carried by said carrier, a stop secured to said bar and adapted to engage said support to limit the longitudinal movement of said bar, and means for limiting the rocking movement of said bar; substantially as described.

12. In a measuring instrument, a support, a carrier slidably and rockably mounted thereon, a gaging device carried by said carrier, and coöperating stop-instrumentalities upon said support and carrier to limit said rocking movement of said carrier, the stop-surface of one of said stop-instrumentalities extending in the direction of said sliding movement; substantially as described.

13. In a measuring instrument, a support, a carrier slidably and rockably supported thereon, a gaging device carried by said carrier, a stop upon said support, and members upon said carrier adapted to engage opposed portions of said stop; substantially as described.

14. In a measuring instrument, a support, a carrier slidably and rockably supported thereon, a gaging device carried by said carrier, a stop-part upon said support and extending in the direction of said sliding movement of said carrier, and members upon said carrier adapted to engage opposed portions of said stop-part; substantially as described.

15. In a measuring instrument, a support, a carrier, means whereby said carrier is slidably and rockably supported on said support, a gaging device carried by said carrier, a stop upon said support, carrier-parts upon opposed sides of said stop, and a spring located between the two elements comprising said stop and one of said carrier-parts and connected to one of said two elements and slidably engaged by the other; substantially as described.

In testimony whereof we hereunto affix our signatures.

CHARLES B. SIMMONS.
FREDERICK G. HUGHES.